Jan. 27, 1970  G. HEIM  3,491,484
INSTALLATION FOR SEALING MUTUALLY MOVABLE PARTS
IN VEHICLES, ESPECIALLY SLIDING
WINDOWS IN MOTOR VEHICLES
Filed Jan. 10, 1968
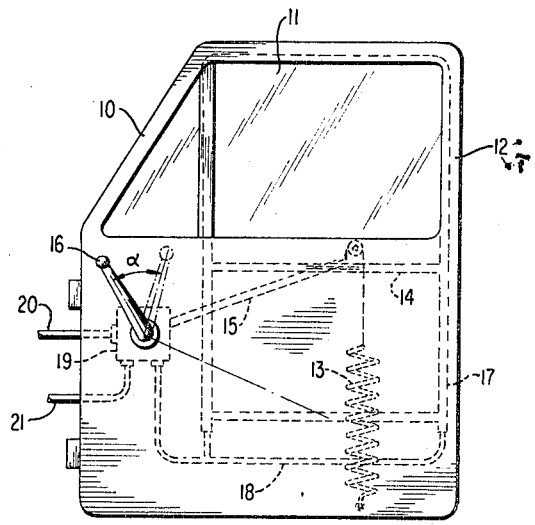
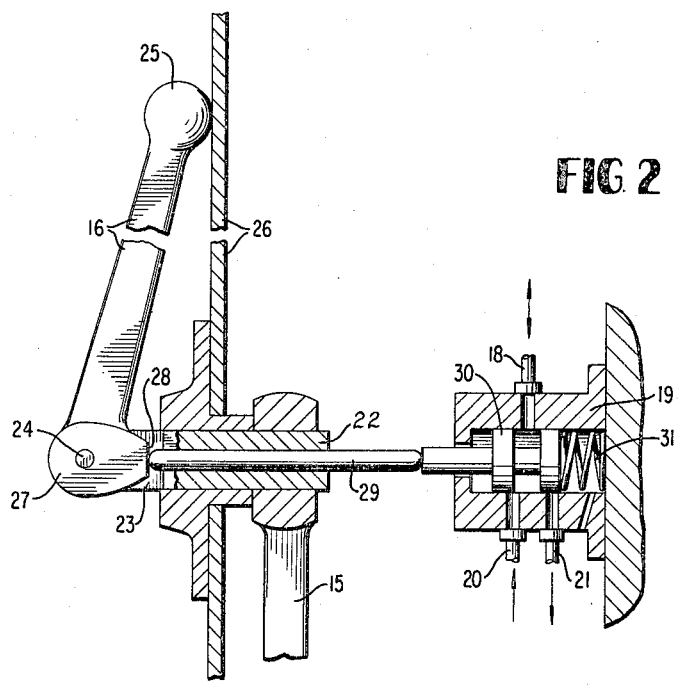
INVENTOR
GERHARD HEIM
ATTORNEYS

United States Patent Office 3,491,484
Patented Jan. 27, 1970

3,491,484
INSTALLATION FOR SEALING MUTUALLY MOVABLE PARTS IN VEHICLES, ESPECIALLY SLIDING WINDOWS IN MOTOR VEHICLES
Gerhard Heim, Sindelfingen, Wurttemberg, Germany, assignor to Daimler-Benz Aktiengesellschaft, Stuttgart-Unterturkheim, Germany
Filed Jan. 10, 1968, Ser. No. 696,922
Claims priority, application Germany, Jan. 11, 1967, D 51,973
Int. Cl. E05f *11/38;* E04f *7/16;* E06b *7/16*
U.S. Cl. 49—348    12 Claims

ABSTRACT OF THE DISCLOSURE

An installation for sealing mutually movable parts in vehicles, especially sliding windows in motor vehicles with respect to their sealing frames, in which a hose-like sealing body is provided on at least one side of the part to be sealed which accommodates on its inside spring means seeking to spread the sealing body apart into sealing abutment against the respective vehicle part to be sealed and in which the sealing body is connected with a line leading to a vacuum by way of a shifting element during the movement of this vehicle part to cause the sealing body to lift off from the part whereby a handle element is connected with the movable vehicle part for the actuation thereof and is adapted to be moved in a first direction for actuation of the movable part while movement of the handle element in a second direction exclusively actuates the shifting element.

Background of the invention

The present invention relates to an installation for the sealing of mutually movable door-, window- or flap-parts in vehicles, especially of sliding windows in motor vehicles with respect to their sealing frame, with the aid of a hose-shaped sealing strip provided at least on one side of the part to be sealed which accommodates on the inside thereof spring means for the expansion into sealing abutment at the respective vehicle part and which, for purposes of the lifting off during the movement of this vehicle part is connected with a line leading to a vacuum by way of a shifting element which simultaneously serves as actuating or control element for the movements of the vehicle part to be sealed as described in my co-pending application Ser. No. 638,137, filed on May 12, 1967, now Patent No. 3,438,150 the contents of which are incorporated herein to the extent necessary.

There is proposed in my aforementioned co-pending application an arrangement as described above, by means of which it is possible to eliminate, so to speak of, the sealing force during the actuation. Consequently, the actuation can be realized in such an arrangement with considerably smaller forces. A lessening of the sealing effect need not be feared because the sealing strip is expanded at all times by the spring means and also is not worn during the movement of the respective vehicle part.

In my aforementioned co-pending application, a pivotal lever handle is proposed which actuates by way of electric contacts the shifting element.

Summary of the invention

The present invention aims at a different solution, which, according to the present invention, essentially consists in that a handle element is operatively connected with the movable vehicle part for the actuation and is adapted to be moved in a predetermined direction or plane and in that this handle element is additionally movable in a second plane or direction in which it actuates exclusively the shifting element.

A completely neat separation of the actuation, for example, of the sliding window and of the shifting element can be attained by the proposal of the present invention. Consequently, the two movements cannot influence each other or interfere with each other. Furthermore, consideration is also given in that connection that the movement for the actuation of the shifting element takes place already automatically upon seizing the lever handle so to speak of.

Installations of the aforementioned type are equipped frequently with an actuating lever adapted to pivot about a first axis for the respective vehicle part. For such installations, the present invention proposes that a handle is non-rotatably connected with the actuating lever and, in its turn, is adapted to be pivoted about a second axis extending at right angle to the first axis. With one construction according to the present invention, the actuating lever is thereby secured on a hollow shaft which terminates at one end in a fork-shaped structure whereby the handle element is pivotally supported on a pin transversely extending through the fork end. A longitudinally displaceable plunger is thereby arranged coaxially within the hollow shaft which abuts, on the one hand, against a cam surface of the handle element and, on the other, against the shifting element.

The arrangement may thereby be made in such a manner that the handle normally abuts completely or nearly against the wall which accommodates the movable vehicle part. Consequently, the handle—in order to be able to rotate the same for purposes of actuation—then has to be pulled at first away from the wall, this movement serves for the actuation of the shifting element. The present invention proposes in particular that a lever handle serves as handle element which is provided at its hub part with a cam surface so constructed that upon pulling the handle—i.e., during pivoting thereof about its transverse axis—the plunger is displaced within the hollow shaft in its longitudinal direction.

A spring force is thereby coordinated to at least one of the mutually abutting members which always re-establishes the normal position. It is thereby feasible to coordinate this spring force to the shifting element which then presses back the entire linkage into the normal position, so to speak of. However, it is also possible that this spring alone is not sufficient and in such cases a return spring has to be associated with or coordinated to the handle.

The construction of the shifting element can take place in any suitable, conventional manner known in the art. However, the present invention prefers a solution according to which a pool-type control slide valve is provided as shifting element which is retained by a spring force in a first position connecting the sealing strip with the external, atmospheric air and which is adapted to be moved against the spring force from the lever handle by means of the plunger into a second position in which the sealing strip is connected with the vacuum.

Accordingly, it is an object of the present invention to provide an installation for sealing mutually movable parts of the type described above which is simple in construction and eliminates the aforementioned short-comings and drawbacks encountered in the prior art.

Another object of the present invention resides in an installation for sealing mutually movable parts is motor vehicles which is equipped with an actuating mechanism that precludes mutual interference between the movements causing actuation of the movable part and the movements causing actuation of the shifting element.

A further object of the present invention resides in an actuating structure for intsallations used for sealing mutually movable parts such as doors, windows or cover parts in motor vehicles which is so constructed and arranged that the preliminary movement necessary for actuating the movable part automatically causes operation of the shifting bond.

Still another object of the present invention resides in an actuating and control arrangement for relatively movable parts in motor vehicles, which is simple in construction, reliable in operation and relatively easy to manipulate.

These and further objects, features and advantages of the present invention will become more obvious from the following description when taken in connection with the accompanying drawing which shows for purposes of illustration only, one embodiment in accordance with the present invention, and wherein:

FIGURE 1 is a schematic elevational view of a sealing arrangement of the present invention for a sliding window in a motor vehicle door; and FIGURE 2 is a schematic cross-sectional view through the handle arrangement and the shifting element in accordance with the present invention.

Referring now to the drawing wherein like reference numerals are used throughout the two views to designate like parts, and more particularly to FIGURE 1, reference numeral 10 designates therein a conventional motor vehicle door in which the approximately rectangular frame-less windowpane 11 is adapted to be displaced upwardly or downwardly within a guide frame 12. The weight of the windowpane 11 is compensated for by the spring 13 which engages at the lower support rail 14 of the pane 11. An actuating lever 15 also engages at this rail 14 which is supported at its end in the door 10 and is operatively connected with the lever handle 16 for the actuation. The windowpane 11 can be moved from its up position downwardly by the movement of the lever handle 16 through the distance a.

Within the guide means 12 the windowpane 11 abuts with its edges on one side against a slide rail. A hose-shaped sealing strip 17 is arranged on the other side thereof. The sealing strip body 17 consists generally of rubber of synthetic resinous material of any conventional type. The construction and arrangement of this hose-shaped sealing strip body 17 is the subject of my aforementioned application and is therefore not described in further detail herein. The sealing strip 17 is connected by way of line 18 with a switching or shifting element 19. The shifting element 19 is actuated by the lever handle 16 in the manner described in my aforementioned prior application. The sealing strip 17 is normally connected by the shifting device 19 with a line 20 leading to the atmospheric air whereas during movement of the pane 11 the sealing strip 17 is operatively connected by way of a line 21 with a vacuum source, for example, with the intake manifold of the engine.

According to FIGURE 2, the actuating lever 15 is secured on a hollow shaft 22. The hollow shaft 22 terminates in or runs out into a fork-shaped end 23. The lever handle 16 is rotatably supported thereat about a transversely extending pin 24. The arrangement is thereby made in such a manner that the handle level 16 normally abuts with its knob 25 against the inner door wall 26. A cam surface 28 is arranged at the hub portion 27 of the lever handle 16.

A plunger 29 abuts against this cam surface 28 which is arranged coaxially on the inside of the hollow shaft 22. With its other end, this plunger 29 is in contact with the spool-type control slide valve member 30 of the shifting device 19. In the illustrated position, this control slide valve member 30 connects the line 18 leading to the sealing strip 17 with the atmospheric air line 20. A spring 31 is coordinated to the control slide valve member 30 which holds the parts in mutual abutment against each other and which possibly also may represent the return spring for the lever handle 16.

In order to actuate the window, the lever handle 16 has to be pulled slightly back from the wall 26. The cam surface thereby presses the plunger 29 and therewith the control slide valve member 30 toward the right. The spool-type control slide valve member 30 closes off the atmospheric air line 20 and now connects the line 18 leading to the sealing strip 17 with the vacuum line 21. Thus, the sealing strip 17 is now evacuated and lifts off from the sealing surface so that the windowpane 11 can now be moved quite readily by rotation of the lever handle 16.

While I have shown and described only one emodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An installation for sealing mutually movable parts in vehicles with the aid of hose-like sealing strip means provided at least on one side of the part to be sealed which accomodates on the inside thereof spring means for expanding the sealing strip means into sealing abutment at the respective vehicle part and which, for purposes of lifting off during the movement of this vehicle part, is adapted to be connected with a line leading to a vacuum by way of a shifting means, serving simultaneously as control element for the movements of the vehicle part to be sealed, wherein the improvement comprises handle means operatively connected with the movable part and movable in a first direction within a first plane for the actuation of the movable part, said handle means being additionally movable in a second direction within a second plane angularly disposed with respect to said first plane in which it actuates exclusively said shifting means.

2. An installation according to claim 1, wherein said movable part is a sliding window movable relative to its sealing frame.

3. An installation according to claim 2, further comprising actuating lever means for the respective vehicle part and pivotal about a first axis, said handle means including a handle portion non-rotatably connected with the actuating lever means and, in its turn, pivotal about a second axis extending substantially at right angle to the first axis.

4. An installation according to claim 3, wherein said actuating lever means is secured to a hollow shaft having a fork-shaped end and the handle portion of said handle means being pivotal about a pin extending substantially transversely through said fork-shaped end.

5. An installation according to claim 4, further comprising a longitudinally displaceable plunger supported in said hollow shaft which abuts, on the one hand, against a cam surface means of the handle means and, on the other, against the sifting means.

6. An installation according to claim 5, wherein a handle lever serves as handle means which is provided at its hub portion with the cam surface means of such construction that upon pulling of the handle lever by pivoting the same about its cross axis, the plunger is displaced in the longitudinal direction within the hollow shaft.

7. An installation according to claim 6, wherein said shifting means includes control slide valve means which is retained in a first position connecting the sealing strip means with the atmospheric air by spring force means and which is adapted to be moved by said handle means against said spring force means by way of said plunger, said sealing strip means being connected in said second position with the vacuum.

8. An installation according to claim 1, further comprising actuating lever means for the respective vehicle part and pivotal about a first axis, said handle means including a handle portion non-rotatably connected with the actuating lever means and, in its turn, pivotal about a second axis extending substantially at right angle to the first axis.

9. An installation according to claim 8, wherein said actuating lever means is secured to a hollow shaft having a fork-shaped end, and the handle portion of said handle means being pivotal about a pin extending substantially transversely through said fork-shaped end.

10. An installation according to claim 9, further comprising a longitudinally displaceable plunger supported in said hollow shaft which abuts, on the one hand, against a cam surface means of the handle means and, on the other, against the shifting means.

11. An installation according to claim 10, wherein a handle lever serves as handle means which is provided at its hub portion with the cam surface means of such construction that upon pulling of the handle lever by pivoting the same about its cross axis, the plunger is displaced in the longitudinal direction within the hollow shaft.

12. An installation according to claim 11, wherein said shifting means includes control slide valve means which is retained in a first position connecting the sealing strip means with the atmospheric air by spring force means and which is adapted to be moved by said handle means against said spring force means by way of said plunger, said sealing strip means being connected in said second position with the vacuum.

References Cited

UNITED STATES PATENTS

| | | | |
|---|---|---|---|
| 2,003,614 | 6/1935 | Shetzline | 49—477 X |
| 2,918,085 | 12/1959 | Govan et al. | 60—52 X |

FOREIGN PATENTS

| | | |
|---|---|---|
| 270,166 | 2/1914 | Germany. |
| 547,072 | 8/1942 | Great Britain. |

J. KARL BELL, Primary Examiner

U.S. Cl. X.R.

49, 316, 477